United States Patent
Lasserre et al.

(10) Patent No.: US 11,312,509 B2
(45) Date of Patent: Apr. 26, 2022

(54) MOBILE MACHINE PROVIDED WITH A FLEX CIRCUIT COMMUNICATION SYSTEM BETWEEN AN EXTERNAL MEASUREMENT DEVICE AND AN INTERNAL UNIT

(71) Applicant: Airbus Operations S.A.S., Toulouse (FR)

(72) Inventors: Hervé Lasserre, Toulouse (FR); Xavier Alquier, Grisolles (FR); Aymeric Plo, Ambres (FR)

(73) Assignee: Airbus Operations S.A.S.

( * ) Notice: Subject to any disclaimer, the term of this patent is extended or adjusted under 35 U.S.C. 154(b) by 270 days.

(21) Appl. No.: 16/785,890

(22) Filed: Feb. 10, 2020

(65) Prior Publication Data
US 2020/0269996 A1    Aug. 27, 2020

(30) Foreign Application Priority Data

Feb. 22, 2019 (FR) ..................... 19 01834

(51) Int. Cl.
*B64F 5/60* (2017.01)
*B64C 1/14* (2006.01)
*B64D 45/02* (2006.01)

(52) U.S. Cl.
CPC .............. *B64F 5/60* (2017.01); *B64C 1/1407* (2013.01); *B64D 45/02* (2013.01)

(58) Field of Classification Search
CPC ......... B64F 5/60; B64C 1/1407; B64D 43/00; B64D 2221/00; B60R 16/0215; B60R 16/023; B60R 16/027; H02G 3/22; H02G 3/30; H02G 3/26; G01D 11/00; G01D 11/30; G01N 33/0009; H05K 1/028
See application file for complete search history.

(56) References Cited

U.S. PATENT DOCUMENTS

| | | | |
|---|---|---|---|
| 5,405,672 A | * | 4/1995 | Takiguchi ........... B60R 16/0222 16/232 |
| 5,886,256 A | | 3/1999 | DeAnna |
| 2002/0088277 A1 | | 7/2002 | Schoess et al. |

(Continued)

FOREIGN PATENT DOCUMENTS

FR      3066270 A1     11/2018

OTHER PUBLICATIONS

French Search Report for Application No. 1901834 dated Dec. 10, 2019, 2 pages.

*Primary Examiner* — Philip J Bonzell
*Assistant Examiner* — Colin Zohoori
(74) *Attorney, Agent, or Firm* — Lerner, David, Littenberg, Krumholz & Mentlik, LLP

(57) ABSTRACT

A mobile machine includes a fuselage having at least one door, inside which is located a unit for processing measurements taken by at least one measurement device installed outside said fuselage. The system for communication between the processing unit and the measurement device includes a flex circuit that is affixed at least partially flat in the door corner between the door and the rim of the opening formed in the fuselage with which the door is associated and one of the ends, the internal end, of which is located inside the fuselage and the other, external, end of which is located outside. Since the flex circuit makes it possible to pass through the wall of the fuselage via the opening for doors, the need to make substantial modifications to the aircraft is avoided.

12 Claims, 3 Drawing Sheets

(56) References Cited

U.S. PATENT DOCUMENTS

| | | | |
|---|---|---|---|
| 2007/0011949 A1* | 1/2007 | Isobe | ............... B60R 16/0222 49/475.1 |
| 2016/0320216 A1 | 11/2016 | Dupe et al. | |
| 2018/0288832 A1 | 10/2018 | Safai et al. | |

* cited by examiner

MOBILE MACHINE PROVIDED WITH A FLEX CIRCUIT COMMUNICATION SYSTEM BETWEEN AN EXTERNAL MEASUREMENT DEVICE AND AN INTERNAL UNIT

FIELD OF THE INVENTION

The present application relates to a system for communicating signals transmitted by a measurement device positioned on the external surface of a mobile machine to a processing unit located on the inside thereof. It may relate to other types of signals, such as for example power supply signals from an internal power supply unit for supplying the external measurement device with power.

The present invention relates in particular to the field of vehicles and more particularly to measurement devices used during aircraft, in particular transport aircraft, in-flight testing. The measurement devices are generally attached temporarily, for the duration of the test, to the external surface of the aircraft, for example to the wing surface. The positioning of the device is chosen according to the parameters to be monitored. The measured data must be transmitted to a processing unit located inside the aircraft, very often inside the cabin. The communication system requires substantial wiring to transmit the measurement data to the processing unit and substantial modifications to the aircraft to provide a feedthrough for the wiring allowing it to be connected to the internal processing unit from the outside.

BACKGROUND OF THE INVENTION

From patent application FR1754171, filed on the 12 May 2017, a communication system using wireless technology is known. Such a system demands the use of a module specifically for wireless technology requiring the installation of antennas and potentially relay systems according to the range needed, and very often an internal battery power supply. While a wireless technology system avoids modifications to the aircraft, it makes the communication system more complex in terms of both installation and maintenance.

BRIEF SUMMARY OF THE INVENTION

Aspects of the present invention may provide a novel communication system that makes it possible to avoid any modification to the aircraft for communication between the external measurement device and the internal processing unit.

An aspect of the present invention relates to a mobile machine comprising a fuselage having at least one door, inside which is located a unit for processing measurements taken by at least one measurement device installed outside said fuselage, characterized in that the system for communication between the processing unit and the measurement device comprises a flex circuit that is affixed at least partially flat in the door corner between the door and the rim of the opening formed in the fuselage with which the door is associated and one of the ends, the internal end, of which is located inside the fuselage and the other, external, end of which is located outside.

In this way, the flex circuit makes it possible to pass through the wall of the fuselage via the opening for a door (the term "door" being understood in a broad sense as will be seen further on in the description), thereby avoiding the need to make substantial modifications to the mobile machine while retaining the required seal that is provided.

Other aspects of the invention envisage at least one of the following optional features, either alone or in combination.

The flex circuit is positioned flat along its entire length against the surface to which it is applied on either side of the door.

The flex circuit is removably attached to the external surface of the fuselage, to the transition zone and to the surface of an inside structure.

Two connection housings are provided on the inside and on the outside of the fuselage for directly connecting the ends of the flex circuit.

The flex circuit comprises protective reinforcements at at least one edge of the door corner.

The flex circuit comprises shielding for protection from lightning.

A zone in which the shielding is interrupted is provided in the door corner.

The flex circuit comprises an extension allowing a ground point of the aircraft to be reached.

The extension comprises a zone that is free of insulating layer and at the site of which a conductive bridge for conducting lightning to a ground point of the aircraft is provided.

The one or more measurement devices are positioned on the external surface of the aircraft and connected by wired connection to the external end of the flex circuit.

A plurality of flex circuits are respectively positioned at the sites of at least two different doors.

The mobile machine is an aircraft.

BRIEF DESCRIPTION OF THE DRAWINGS

Other aspects, features and advantages will become apparent from the following description of the invention, which description is provided solely by way of non-limiting example with reference to the appended drawings, in which.

DETAILED DESCRIPTION

Figure 1:
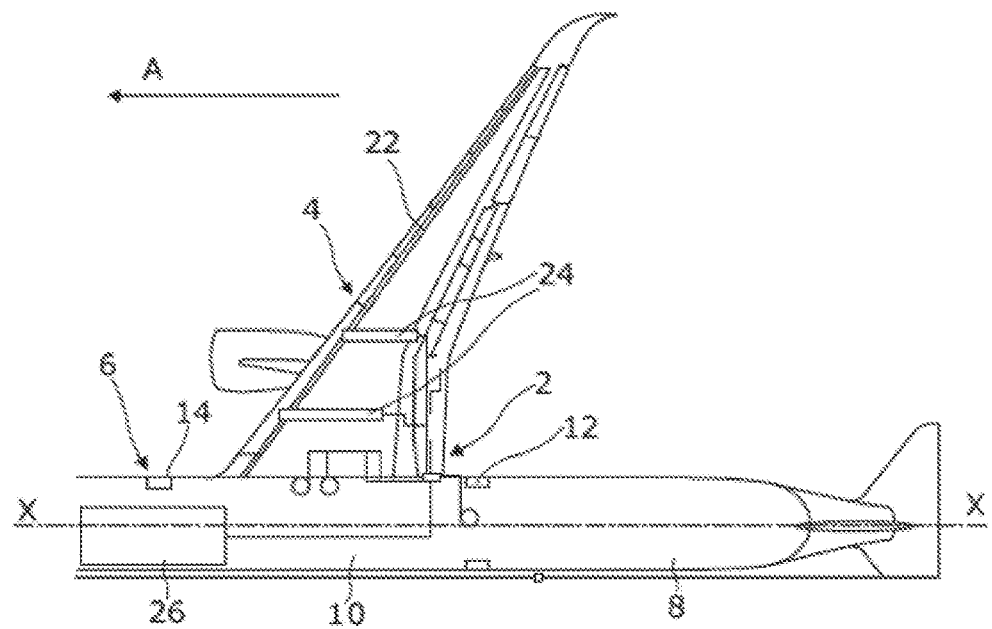
FIG. 1 is a partial view from above of an aircraft provided with a communication system according to an embodiment of the present invention.

As illustrated in FIG. 1, the present invention relates to a communication system 2 for a system 4 for measuring physical parameters that are used to analyse the operation of a mobile machine 6. Studying the results makes it possible to understand the behaviour thereof and to improve or check the performance thereof. The mobile machine may be of any type: a test model (the model being considered mobile due to the movement of the airflow around it simulating the motion of the model, which is otherwise stationary), or a vehicle such an aircraft, train, bus, lorry, car, etc. Throughout the remainder of the description, the example of a transport aircraft 6 will be the focus.

An aircraft 6 such as shown in FIG. 1 comprises a body 8 forming an enclosed space, more commonly referred to as the fuselage. In a transport aircraft, in particular, a cockpit is located in the front portion of the fuselage and a cabin 10 with a floor 11 (see FIG. 2) is located behind the cockpit. The terms "front" and "rear" are used with reference to the direction of movement of the aircraft in flight represented by the arrow A in FIG. 1. It will be assumed that the aircraft 6 is resting on horizontal ground and that any plane parallel to the ground is horizontal and any plane perpendicular to the ground is vertical. The terms "lower" and "upper" are used with reference to this vertical direction.

Figure 2:
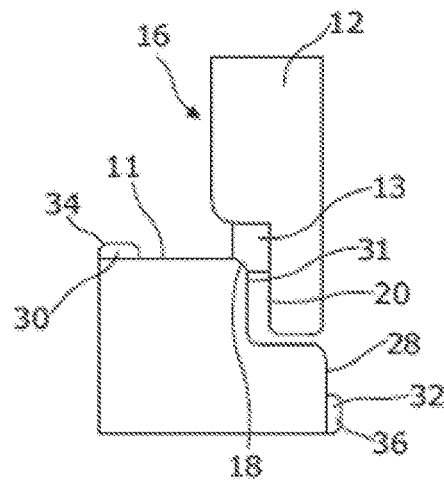
FIG. 2 is a schematic representation in a sectional side view of a communication system at the lower rim of a door in the closed position.
Figure 3:
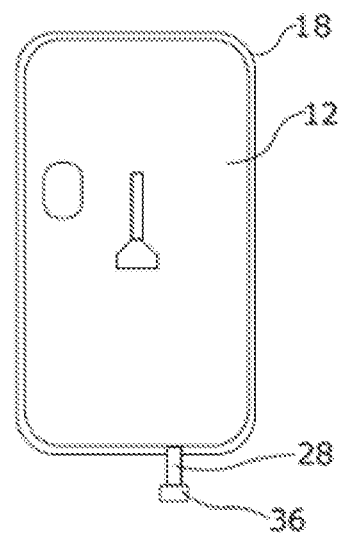
FIG. 3 is a schematic representation in a front view from outside the door shown in FIG. 2.

As illustrated in FIGS. 1 to 3, the fuselage 8 includes at least two doors 12, 14. The fuselage 8 has, at the site of each of the doors 12, 14, an opening 16, the vertical rim of which has means, for example hinges, for the articulated connection of the door to the fuselage. The horizontal lower rim 18 of the door is located at the same level as the floor 11. The peripheral extremity of the door is provided with a seal 13 to make the connection with the fuselage sealtight. Some doors, for example those providing an emergency exit, might not have an articulated connection. They may be used in the context of the invention but are of less interest due to the increased difficulty in setting up and removing the communication system according to an embodiment of the invention. The present invention may be applied to other openings in the aircraft having a door 12 understood in a broad sense: it may be for example a panel for accessing the aircraft, or a hatch such as a hatch for accessing the belly fairing of the aircraft. A seal 13 may be provided to seal the opening in question. Regardless of the application, the fuselage of the mobile machine comprises a structure 11 inside the fuselage that is sufficiently close to the door for a portion of the communication system to be affixed thereto, in this instance a floor 11.

The rim 18 of the opening 16, as shown in the cross section of FIG. 2, has an L-shaped stepped profile against which the complementary upside-down L-shape of the rim 20 of the door 12, 14 is applied. The transverse direction corresponds to a direction perpendicular to the longitudinal direction of the aircraft corresponding to the direction of the axis X-X in FIG. 1. The aircraft 6 also includes a wing 22 attached to the fuselage 8. The well-known set of elements that make up an aircraft will not be described in any more detail since it is not necessary for the description of the invention.

The measurement assembly comprises at least one measurement device 4 for measuring physical quantities, in particular during in-flight testing. The measurement device 4 is arranged outside the fuselage 8 of the aircraft. It may for example take the form of a flexible carrier 24 for sensors that is affixed to the external surface of the aircraft and conforms to the contours thereof. In the embodiment illustrated in FIG. 1, the carrier 24 is attached to the external surface of the wing 22. The carrier 24 is one example; other types of measurement devices may be used, such as a camera or a microphone, inter alia. The measurement assembly also comprises a unit 26 for processing the measurement data produced. The processing unit 26 is arranged inside the fuselage, for example in the cabin 10. The function of the processing unit 26 is to acquire the signals from the one or more external measurement devices 4 and potentially to process them and/or to retransmit them to another unit. It may also function as a power supply for the one or more measurement units, although this function may be performed by another, independent component. The focus of the present invention is more particularly the communication system between the external measurement device 4 and the internal unit 26 for processing measurement signals from the one or more devices 4 and potentially power supply signals for the one or more devices 4, or any other signal such as for example a timing signal required in the exchanges made within the measurement assembly.

The communication system uses a flex circuit 28 to make it possible to pass through the wall of the aircraft at the site of the doors 12, 14 without having to make a hole in it or modify it. The term "flex circuit" in the present description covers any flexible printed circuit, namely a printed circuit incorporated on a substrate exhibiting the property of being flexible, such as an elastomer or plastic substrate. The flex circuit is of a known type, commonly referred to as a flex PCB (flexible printed circuit board). The flex circuit 28, in addition to being flexible, has a second characteristic which is that of being thin, namely thinner than the thickness of the majority of wires of the same level of performance.

The flex circuit 28 allows the external measurement device 4 to be connected to the processing unit 26 inside the aircraft. It is placed flat at the site of the door crossing such that one of its ends 30 is located inside the fuselage of the aircraft, namely, in the example given here, inside the cabin, and the other end 32 is located outside the fuselage of the aircraft; the circuit 28 is affixed to the surface of the fuselage in the door corner. Due to its flat and thin structure, the flex circuit does not damage the door seal 13 or negatively affect its performance and limits the pressure exerted thereon. The flex circuit encases a printed circuit within a substrate which prevents the formation of air gaps if the wires with the most protruding profiles are separated.

Figure 6:
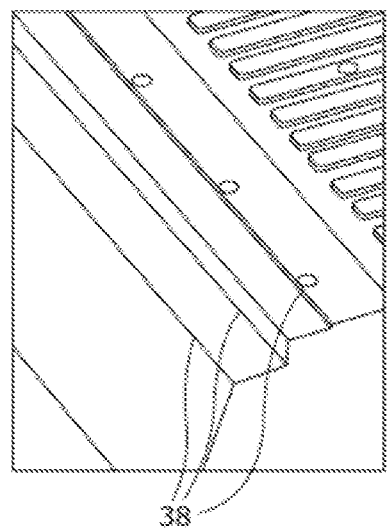
FIG. 6 is a schematic representation in perspective of a door rim of different shape with respect to that of FIG. 2, in which the edges on which rests a flex circuit of the communication system according to an embodiment of the present invention are clearly visible.
Figure 7:
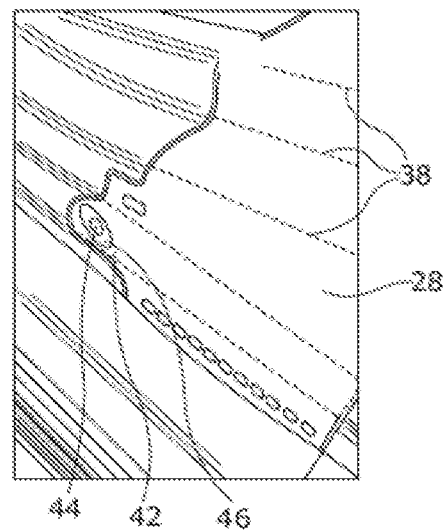
FIG. 7 is a schematic representation in perspective of a flex circuit of the communication system according to an embodiment of the present invention installed on a door rim of different shape with respect to that of FIGS. 2 and 6 and for which the edges of the door rim are highlighted by dotted lines.

As illustrated in FIGS. 6 and 7, the door corner may have multiple steps exhibiting protruding edges 38. To avoid damaging the printed circuit, reinforcements 40 (represented by an unbroken line in FIG. 4) are added to the flex circuit at the site corresponding to the edges 38 when the flex circuit 28 is arranged in the aircraft. According to one possible embodiment of the reinforcements 40, they consist of an increased thickness of substrate; according to another embodiment, they could be produced by inserting a patch of different material into the substrate.

The circuit 28 according to one illustrative embodiment is attached from its internal end 30 to its external end 32 to the surface of an internal structure, here the floor 11, to the external surface of the fuselage and to the surface in the zone 31 forming the connection between the floor and the external surface of the fuselage, referred to as the transition zone 31. In the embodiment illustrated, the flex circuit 28 is positioned at least partially flat in the transition zone and here over its entire length so as to be superposed thereonto and to form a single unit with the surface to which it is affixed so as to be level therewith. The circuit is attached to the fuselage, to the transition zone and to the floor of the cabin, for example using means that allow it to be removable. It may for example be attached using a double-sided affixing tape, an adhesive or a special film.

Figure 5:
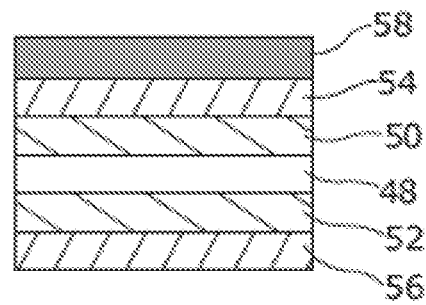
FIG. 5 is a schematic representation in cross section of the various layers in the flex circuit of FIG. 3.

The flex circuit comprises a plurality of layers, which are schematically shown in FIG. 5 in cross section. The flex circuit 28 comprises a layer 48 corresponding to the printed circuit. Above and below the printed circuit, insulating layers 50, 52 are provided, which are referred to as the upper insulating layer 50 for the layer located above the circuit 48 and the lower insulating layer 52 for the layer located therebelow, these layers preventing short circuits. In this embodiment, the insulating layers 50, 52 correspond to the substrate mentioned above. The flex circuit is shielded for protection from lightning: an upper shielding 54 above the upper insulating layer and a lower shielding 56 below the lower insulating layer. A layer 58 for protection from corrosion is provided to cover the assembly opposite the surface of the flex circuit that is intended to be attached to the mobile machine.

Figure 4:
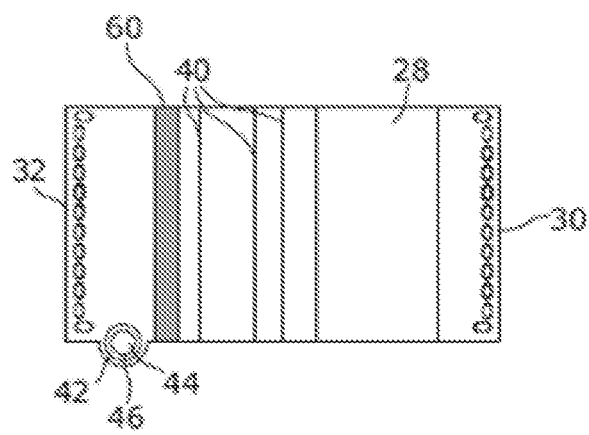
FIG. 4 is a schematic representation in a plan view from above of the flex circuit of the communication system according to an embodiment of the present invention.

To allow lightning to be conducted to one or more ground points on the external structure of the aircraft fuselage, the flex circuit comprises zones 46 (drawn so as to be visible in FIG. 7) without insulation that allow the upper and lower shielding to be electrically connected to a ground point on the structure. The zones 46 are therefore formed geometrically on the circuit facing elements on the aircraft leading to one or more ground points. In the embodiment illustrated, the flex circuit 28 comprises an extension 42 that makes it possible to reach an element on the aircraft that is suitable for leading to a ground point, taking, in the example illustrated, the form of a fastening bolt in the door threshold. The fastening bolt passes through the flex circuit at the site of the extension 42. The flex circuit also includes a zone 60 (represented by a grey strip and drawn so as to be visible in FIG. 4) in which the lower 56 and upper 54 shielding is interrupted, referred to as the interruption zone 60, which is positioned facing the door corner or the door seal in order to avoid creating a point of entry for lightning into the interior of the fuselage by providing a preferred path into the structure of the aircraft. It is not necessary to provide a connection to a ground point for the lower and upper shielding located inside the aircraft, which is not exposed to lightning, hence the positioning of the interruption zone 60 at the boundary between the inside and the outside of the aircraft formed by the door corner or the door seal. In the embodiment illustrated, the outside of the aircraft is characterized by being exposed to a lightning impact, unlike the inside of the aircraft. The shape of the flex circuit therefore depends on the site at which the flex circuit must be placed and on its configuration so as to adapt the positioning of the reinforcements 40 and of the elements for protection from lightning, the zone 46 without insulation, the shielding 54, 56, the interruption zone 60 and the extension 42, if required. The flex circuit takes the overall shape of a long rectangle imparted by the printed circuit, hence the term "extension" used if the rectangular shape does not allow elements of the aircraft that are connected to ground points to be reached. In the case that the rectangular shape allows at least one such element to be reached and covered, the term "extension" also covers the (one or more) portions of the flex circuit that are intended for connection to (one or more) ground points, even though, strictly speaking, it is no longer an "extension" in the geometric sense of the term. As shown in FIGS. 4 and 7, in the embodiment illustrated, the extension 42 of the flex circuit comprises a zone 44 corresponding to the location of the bolt once the flex circuit has been installed on the aircraft. In this zone 44, there is no insulating layer but instead a conductive bridge to a ground point on the aircraft that takes, in the example illustrated, the form of conductive, for example metal, washers 46 fitted above and below the flex circuit, at the same level as the shielding and around the opening made for the bolt in the aircraft. When the flex circuit 28 is installed on the aircraft, the zone 44 is placed so as to match up with the opening made to accept the bolt. When the bolt is inserted into the aircraft, it rests against the conductive washer 46 provided on the flex circuit and provides a preferred path for lightning through the washers 46 and the bolt to reach a ground point inside the aircraft.

The ends 30, 32 of the flex circuit, as shown in FIG. 4, bear the ends of tracks. The ends of the tracks as shown in FIGS. 4 and 7 may be electrically connected directly to contact zones in order then to be soldered or connected to the connecting elements provided to connect the flex circuit to the processing unit 26 and to the measurement devices. According to another possible embodiment shown in FIG. 2, all of the track ends may also be encased in a connection housing 34, 36. Two connection housings 34, 36 may be provided on the inside and on the outside of the fuselage to allow each of the ends 30, 32 of the flex circuit 28 to be connected. The housings 34, 36 are pre-fitted before the flex circuit is mounted on the aircraft. In comparison with the exposed ends, the housings 34, 36 allow additional functions to be incorporated. Thus, for example, the housings 34, 36 may incorporate clipping components such as diodes in order to protect the flex circuit from residual interference from lightning. One of the housings, the internal housing 34, is attached to an internal structure inside the fuselage and, in the example illustrated, to the floor 11. The other housing, the external housing 36, is attached to the outside of the fuselage and, in the example illustrated, to the external surface of the fuselage. The housings 34 and 36 are attached in proximity to the door 12, 14 where the flex circuit is installed at a distance such that once the flex circuit has been affixed over its entire length to the surface of the floor, of the transition zone and of the fuselage, the internal 30 and external 32 ends of the flex circuit are positioned level with the internal 34 and external 36 housings, respectively, so that they can be connected thereto easily. As a result, when the door 12, 14 is in the closed position, since the flex circuit is superposed and attached flat at least in the transition zone and, in the embodiment illustrated, over its entire length and is connected by its ends to the housings 34 and 36, it puts no stress on the seal 13 and prevents the formation of a gap which would affect the seal of the door when closed, resulting in both air escaping and associated noise. The processing unit 26 is connected by wired connection to the housing 34. The housing 36 forms an interface for the connection of the circuit 28 to the measurement device 4. The measurement device 4 is connected by wired connection to the housing 36. The measurement device 4 may comprise a plurality of carriers 24. The housing 36 may also act as a switch.

The same applies in the embodiment in which the track ends are exposed, i.e. without a housing, one of the ends being attached on the inside of the aircraft and the other end on the outside. The ends 30, 32 are attached in proximity to the door 12, 14 where the flex circuit is installed at a distance such that once the flex circuit has been affixed to the surface of the floor, of the transition zone and of the fuselage, the internal 30 and external 32 ends, respectively, of the flex circuit are positioned so that they can be connected to the contact zones, and superposed and attached flat at least in the transition zone and, in the embodiment illustrated, over its entire length, putting no stress on the seal 13 and preventing the formation of a gap which would affect the seal of the door when closed, resulting in both air escaping and associated noise.

A plurality of flex circuits 28 may be respectively positioned at the site of one and the same door and for example two flex circuits, or at the site of at least two different doors, and for example one or two flex circuits per door. This may allow them to be placed as close as possible to the measurement devices that are installed on the external surface of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mobile machine comprising:
a fuselage having at least one door;
a unit, located inside the fuselage, for processing measurements taken by at least one measurement device installed outside said fuselage,
wherein the system for communication between the processing unit and the measurement device comprises:
a flex circuit affixed at least partially flat in the door corner between the door and the rim of the opening formed in the fuselage with which the door is associated and one of the ends, the internal end, of which is located inside the fuselage and the other, external, end of which is located outside.

2. The mobile machine according to claim 1, wherein the flex circuit is positioned flat along an entire length thereof against the surface to which the flex circuit is applied on either side of the door.

3. The mobile machine according to claim 1, wherein the flex circuit is removably attached to the external surface of the fuselage, to the transition zone and to the surface of an inside structure.

4. The mobile machine according to claim 1, further comprising first and second connection housings on the inside and on the outside of the fuselage, respectively, for directly connecting the ends of the flex circuit.

5. The mobile machine according to claim 1, wherein the flex circuit comprises protective reinforcements at at least one edge of the door corner.

6. The mobile machine according to claim 1, wherein the flex circuit comprises shielding for protection from lightning.

7. The mobile machine according to claim 6, further comprising a zone in which the shielding is interrupted is provided in the door corner.

8. The mobile machine according to claim 1, wherein the flex circuit comprises an extension allowing a ground point of the aircraft to be reached.

9. The mobile machine according to claim 8, wherein the extension comprises a zone that is free of insulating layer and a conductive bridge for conducting lightning to a ground point of the aircraft at the site of the zone.

10. The mobile machine according to claim 1, wherein the one or more measurement devices are positioned on the external surface of the aircraft and connected by wired connection to the external end of the flex circuit.

11. The mobile machine according to claim 1, wherein the flex circuit comprises a plurality of flex circuits respectively positioned at the sites of at least two different doors.

12. The mobile machine according to claim 1, wherein the mobile machine is an aircraft.

* * * * *